United States Patent
Husen

[11] 3,734,007
[45] May 22, 1973

[54] CONVEYOR PRESS

[75] Inventor: Gerhard J. Husen, Tacoma, Wash.

[73] Assignee: Hygrade Food Products Corporation, Detroit, Mich.

[22] Filed: Mar. 1, 1971

[21] Appl. No.: 119,579

[52] U.S. Cl. .................................................100/152
[51] Int. Cl. ..............................................B30b 5/04
[58] Field of Search......................100/151, 152, 153, 100/154, 118, 119, 120; 99/107

[56] References Cited

UNITED STATES PATENTS

| | | | |
|---|---|---|---|
| 243,369 | 6/1881 | Gubbins | 100/152 |
| 656,833 | 8/1900 | Beal | 100/151 X |
| 2,275,780 | 3/1942 | Maloney | 100/151 X |
| 3,230,866 | 1/1966 | Branders et al. | 100/151 X |
| 2,150,984 | 3/1939 | Near et al. | 100/151 UX |

*Primary Examiner*—Peter Feldman
*Attorney*—Hill, Sherman, Meroni, Gross & Simpson

[57] ABSTRACT

A conveyor for deformable items such as meat for use as an infeed to a secondary device which concludes a lower conveyor bed for movement in a given direction with a support plate positioned under the product carrying surface and an upper conveyor inclined at an angle to the lower conveyor and moving therewith with a support plate under the product contacting surface, the lower conveyor extending beyond one end of the upper conveyor whereby a product may be placed on the extension of the lower conveyor and moved in between the upper and lower conveyor where it will be contacted by both and compressed while being conveyed to the outlet end of the conveyor.

10 Claims, 9 Drawing Figures

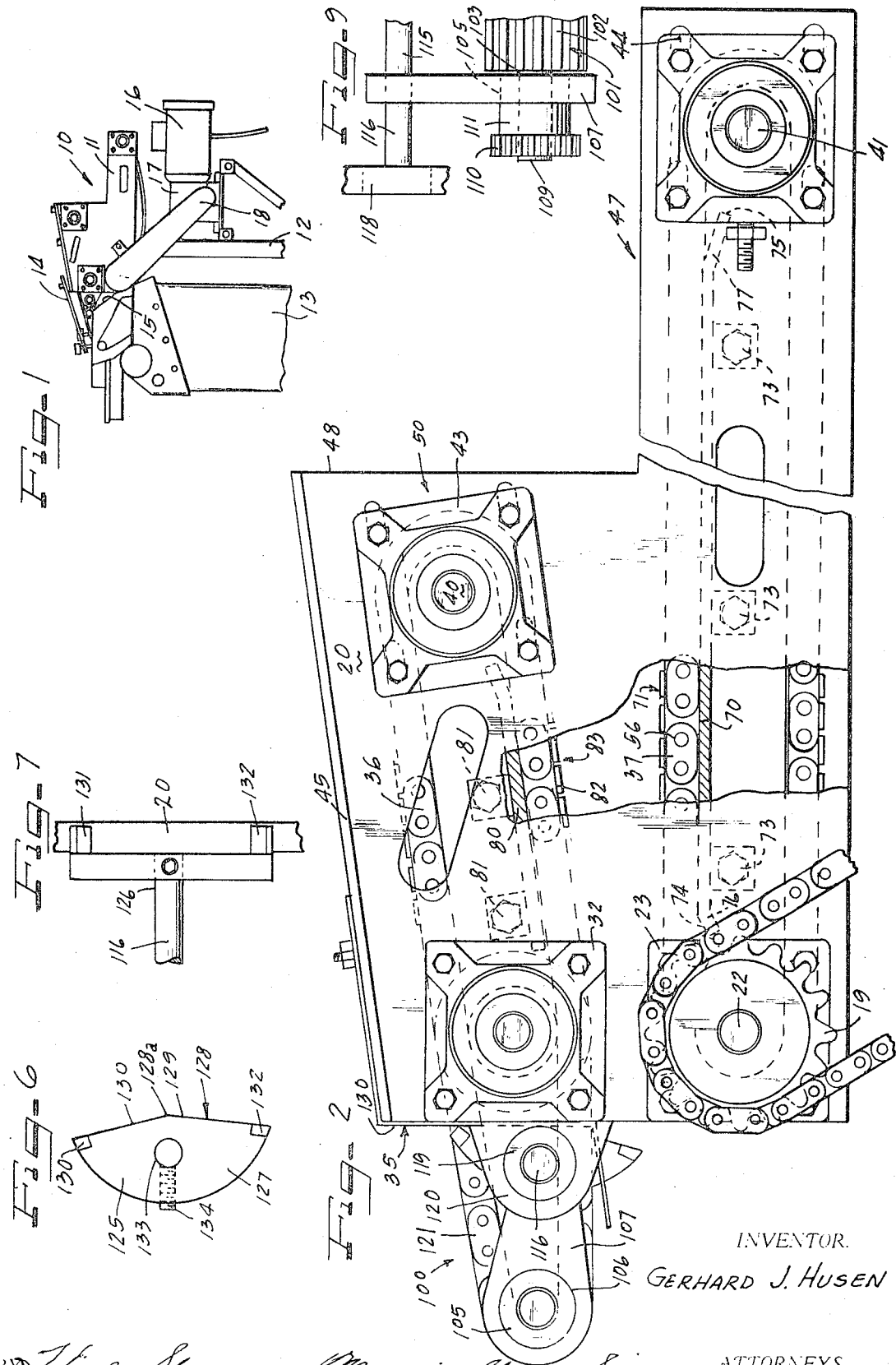

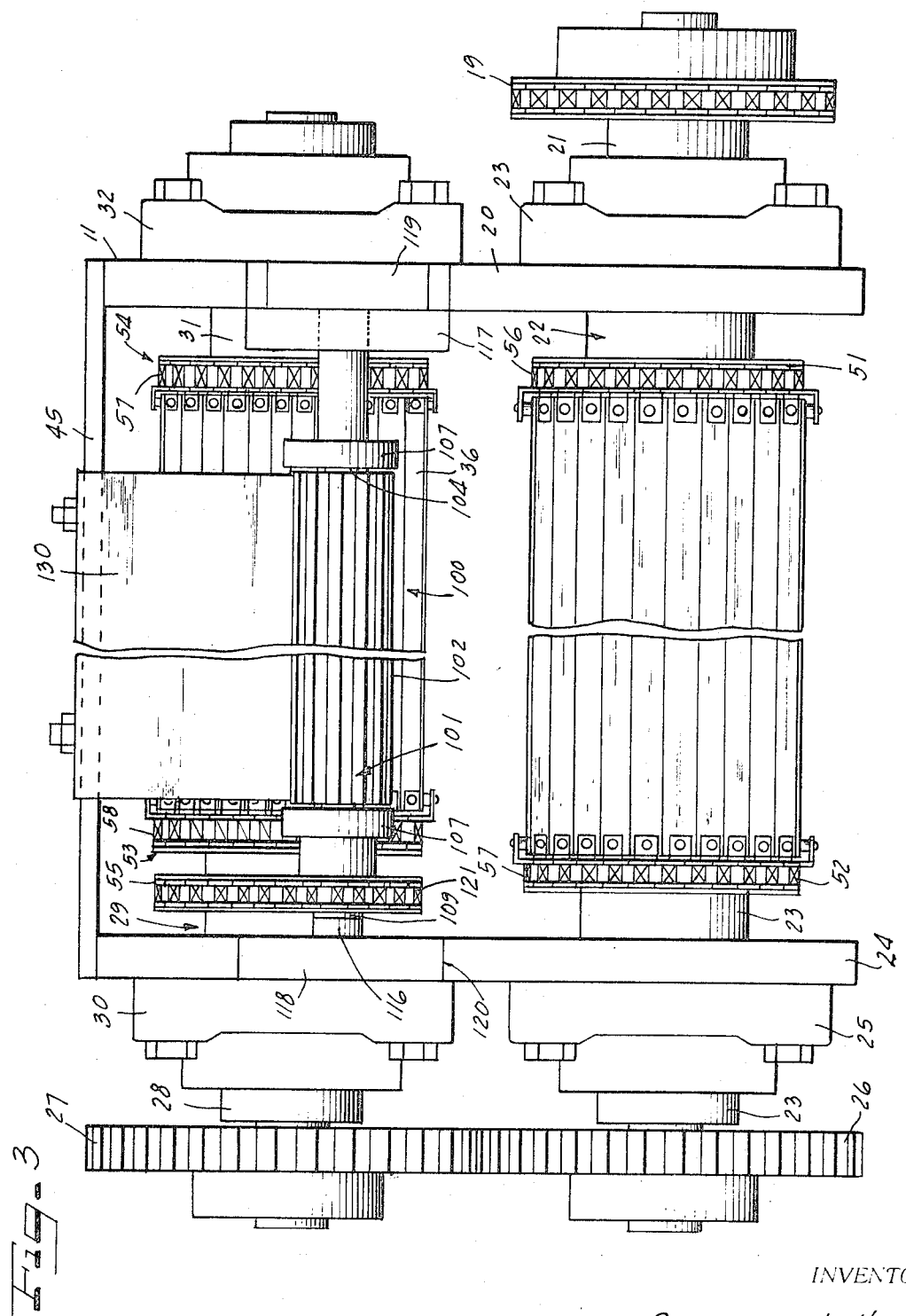

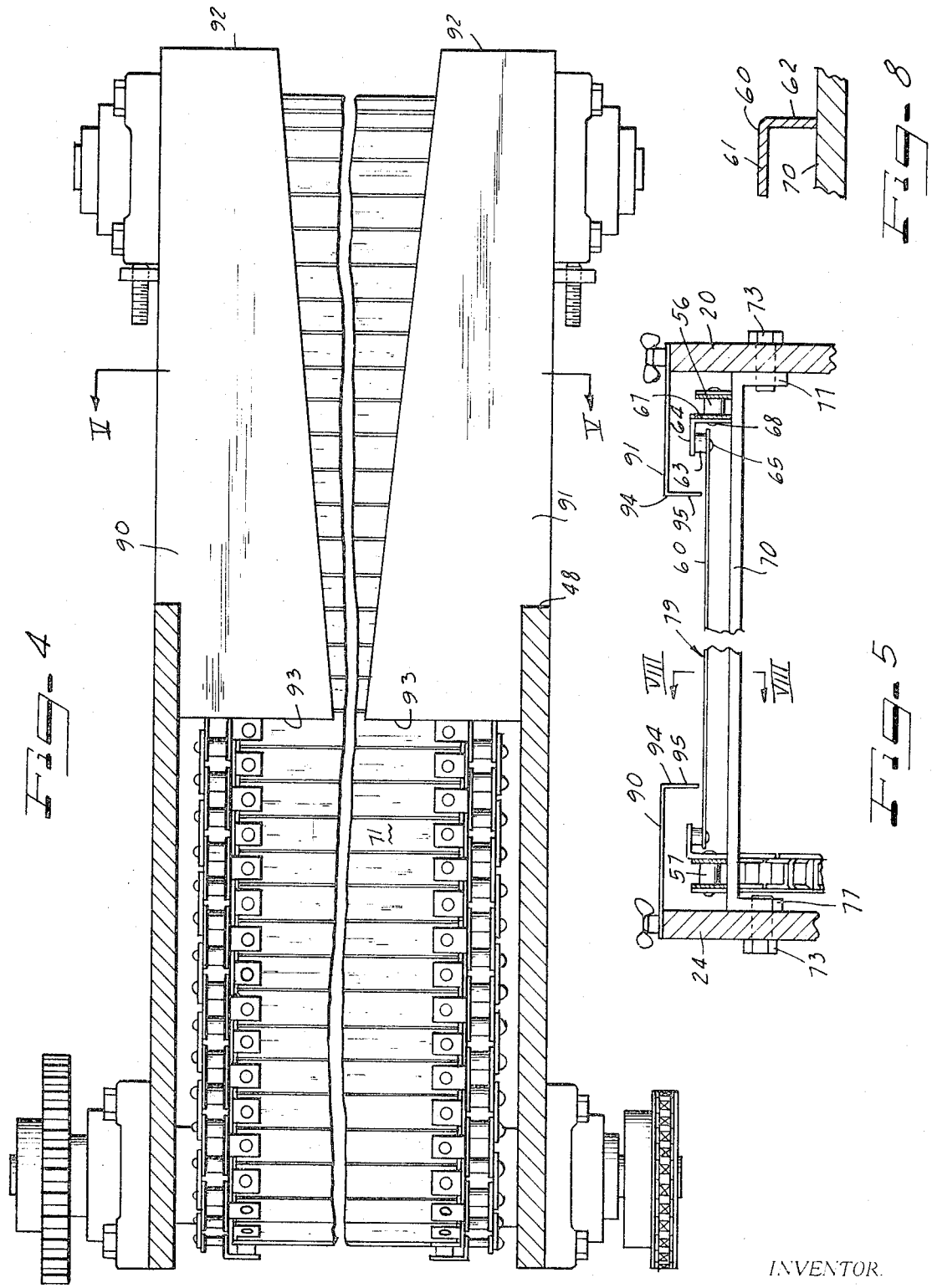

CONVEYOR PRESS

BACKGROUND OF THE INVENTION

1. Field of the Invention

This invention relates to conveyors and more particularly to a compressing conveyor.

2. Prior Art

The art has long utilized endless belt or moving platform conveyors for moving a product from one point to another. Many such conveyors have been used for infeed transportation to a secondary machine. Such prior art conveyors have normally comprised solely a single endless belt or platform.

In many instances, particularly in meat preparation, it is desirable to pre-deform a product prior to infeed to a secondary machine. Further, it is oftentimes desirable to infeed a product having a maximum determinable thickness in at least one dimension. While this has normally been accomplished through the use of opposed spaced-apart rollers or the like mechanisms, it has not heretofore been done gradually in connection with the infeed conveyor.

SUMMARY

This invention provides an infeed conveyor which is capable of compressing a product to a maximum thickness in one dimension gradually while moving the product to the infeed station of a secondary machine.

The conveyor consists of a normally horizontal lower conveyor belt which has a pressure or support plate positioned under the top surface thereof to restrict downward movement of the surface. A secondary conveyor is positioned above the horizontal conveyor and is inclined with respect thereto, being spaced closer to the lower conveyor at the outlet end of the conveyor assembly and further from the lower conveyor upstream of the outlet end. The upper conveyor is shorter than the lower conveyor with the lower conveyor extending beyond the upper conveyor away from the outlet end. The upper conveyor has a support plate under its lower surface to restrict upward movement of the surface. Both conveyors are preferably driven at the same rate from a common drive source, and are attached to a common housing. Any deformable product having a dimension sufficient to be received between the widest spaced-apart cooperating surfaces of the upper and lower conveyors may be placed upon the extension of the lower conveyor to be conveyed between the two conveyors where it will be compressed gradually while being conveyed to the downstream or infeed end of the conveyor assembly. The provision of the support plates underneath the upper surface of the lower conveyor and the lower surface of the upper conveyor provides a firm support for the belts to prohibit outward movement thereof whereby the product will be compressed or deformed.

A limited vertical movement grooved roller may extend beyond the infeed end of the conveyor to act upon products dispensed from the conveyor to aid in their delivery to the secondary machine.

It is therefore an object of this invention to provide a new and improved conveyor.

It is a further object of this invention to provide a conveyor press wherein the conveyor presses a product being transported by it.

It is yet another and more specific object of this invention to provide a conveyor press assembly having a lower horizontal conveyor surface and an upper inclined conveyor surface, the upper surface being spaced closer to the lower surface at the downstream end of the upper surface and further from the lower surface at the upstream end thereof.

It is a specific object of this invention to provide a conveyor assembly having a horizontal endless belt conveyor with a support plate under the conveyor surface and an inclined conveyor positioned above the horizontal conveyor with a support plate under its lower surface, the upper conveyor converging towards the lower conveyor on its downstream end and the lower conveyor extending beyond the upper conveyor on its upstream end, the two conveyors commonly driven and effective to compress a product received therebetween.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a fragmentary side plan view of the conveyor assembly of this invention attached in position to infeed a secondary machine.

FIG. 2 is a fragmentary plan view partially in section of the conveyor assembly of this invention on a scale greater than FIG. 1.

FIG. 3 is a fragmentary end plan view of the conveyor assembly of FIG. 2.

FIG. 4 is a fragmentary top plan view of the lower conveyor of this invention.

FIG. 5 is a fragmentary cross-sectional view taken along the lines V—V of FIG. 4.

FIG. 6 is a side plan view of the motion limiter of the infeed roller of this invention.

FIG. 7 is a front plan view of the motion limiter of FIG. 6.

FIG. 8 is a fragmentary cross-sectional view taken along the lines VIII—VIII of FIG. 5. FIG. 9 is a fragmentary plan view of the infeed roller attachment section of this invention.

FIG. 9 is a fragmentary plan view of the infeed roller attachment section of this invention.

DESCRIPTION OF THE PREFERRED EMBODIMENT

The conveyor press 10 of this invention is contained in a housing 11 mounted on a pedestal 12 or other support. The conveyor press 10 may be attached to a secondary machine 13 as by fastening members 14 to maintain it in position adjacent the product receiving opening 15 of the secondary machine. The conveyor assembly 10 is driven as by a motive source 16 through a gear reduction box 17 and a chain drive 18. Further, due to the provision of the upper slant to the side walls, the roller 40 can be placed above the roller 29 and to the rear thereof. In this manner, the upper conveyor 36 will slant downwardly from the rear end 50 thereof to the infeed end 35. By placing the lower rear roller 41 on the same plane as the forward rear roller 22, the lower conveyor 37 is level or normally horizontal. Thus, the two conveyors converge towards one another due to the provision of the slant of the upper roller.

As best illustrated in FIG. 3, the lower front roller 23 has sprockets 51 and 52 mounted thereon. The rollers 51 and 52 are spaced from the side walls 20 and 24 and are affixed to the roller for rotation therewith. The upper forward roller 29 has sprockets 53 and 54 mounted thereon for rotation therewith in the same manner as the sprockets 51 and 52.

The sprockets 53 and 54 are spaced apart from one another approximately the same distance as the sprockets 51 and 52 and may be vertically aligned with one another. However, as illustrated in FIG. 3, it is acceptable if the sprocket 53 on the upper roller is not aligned with the sprocket 52 on the lower roller, thereby providing space for a third sprocket 55 on one side of the upper roller 29.

Endless link chains 56, 57, 58 and 59 index respectively with the sprockets 51, 52, 53 and 54. The chains pass to the respective sprockets (not illustrated) on the rear rollers 40 and 41 which are aligned with the front roller sprockets. The chains provide the support sides and motive members for the conveyors 36 and 37.

As best illustrated in FIGS. 2, 5 and 8, the conveyor belts 36 and 37 consist of a plurality of angled plates 60 which have a horizontal leg 61 and a vertical leg 62 integral with the horizontal leg 61 at one end thereof. The plates 60 extend transversely across the conveyor belt from adjacent one chain to adjacent the opposite chain.

The plates 60 are attached to the chains 56, 57, 58, 59 by means of angled tabs 64 which have a vertical leg 65 fastened to the locking pins 68 of the individual links of the chains. The horizontal leg of the angled tabs 64 overlies a portion of the horizontal leg 61 of the plates 60 and is maintained in spaced relationship thereto by a spacer 63. A locking pin or rivet 65 projects through the horizontal leg 61, the spacer 60, and mates with the parallel horizontal leg 6 of the angled tab 64. In this manner, the conveyors are formed of an endless bed of individual angled plates 60 attached to the side chains which in turn are received around the sprockets and driven thereby on an impetus from the drive chain 18.

A lower pressure plate 70 is positioned beneath the upper portion 71 of the lower conveyor belts 37. The pressure plate is attached to the side walls 20 and 24 as by means of bolts 73. The pressure plate terminates at its forward end 74 in spaced clearance relation to the roller 22. The pressure plate 70 terminates at its rear 75 in spaced relation to the roller 41. The forward 76 and rearward 77 ends of the pressure plate 70 may be angled downwardly to provide conveyor belt clearance, thereby preventing binding. The pressure plate 70, as best illustrated in FIG. 5, preferably extends from the side wall 20 to the side wall 24 and terminates in flange portions 77 which have apertures therein receiving the bolts 73. The pressure plate directly underlies the upper portion of the conveyor and provides a support for the legs 62 of the individual angled pieces 60. In this manner, the upper portion of the lower conveyor rides on the pressure plate 70 which provides a base for the conveyor so that irrespective of the load on the product carrying surface 79 of the conveyor, the conveyor is maintained in a given plane.

A second pressure plate 80 extending from the side wall 20 to the side wall 24 and attached thereto as by bolts 81 is positioned above the lower portion 82 of the upper conveyor 36. The pressure plate 80 extends from adjacent the front roller 29 to adjacent the rear roller 40 of the upper conveyor 36 and contacts a portion of the vertical leg 62 of the individual angled member 60 comprising the bed of the upper conveyor. The pressure plate 80 then provides upward support for the lower portion of the upper conveyor so that irrespective of the pressure applied to the product contacting portion 83, the upper conveyor will not bow upwardly.

As best illustrated in FIGS. 4 and 5, product guide plates 90 and 91 are attached to the side walls 20 and 24 to the rear of the stepped portion 48. The guides extend inwardly towards one another from the side walls and are angled to converge towards one another from the rear 92 to the front 93 thereof.

The guides 90, 91 terminate in their opposed faces 94 in substantially right angle downturned flanges 95 which provide opposed faces. The downturned flanges 95 terminate in closely spaced relation to the product carrying surface 79 of the upper portion of the lower conveyor 37.

The guide plates 90 and 91 extend inwardly from the side walls a sufficient distance at their widest spaced-apart point to extend over the drive chains 56, 57 and angle bar 60 connection means 63, 64, 65. The guide plates 90, 91 remain spaced apart from one another for their entire longitudinal length and project between the upper and lower conveyors forward of the stepped portion 48 to a point approximately beneath the roller 40. In this manner, a product placed on the extended portion 47 of the lower conveyor is guided towards a center position on that conveyor by the guide plates 90, 91 prior to the time that the product passes the stepped portion 48 of the housing 11 and arrives at a position under the upper conveyor 36. At that point, it will be substantially centered with respect to both the lower and upper conveyors. Thereafter, the guide plates 90, 91 terminate below the upper conveyor forward of the stepped portion 48 at their forward ends 93. Thus, any product which enters the space between the upper and lower conveyors with a height dimension greater than the minimum space between the upper and lower conveyors at the forward end can be compressed and spread sidewise without interference from the guide plates 90, 91.

Due to the angled relationship of the upper conveyor with respect to the lower conveyor, any product which has an original height greater than the minimum space between the upper and lower conveyors at the forward or infeed end of the conveyor assembly, will be compressed between the upper and conveyors to a given maximum height. Due to the pressure plates 70 and 80, the upper and lower conveyors cannot bow away from one another and the product will be gradually compressed to the minimum conveyor spaced-apart distance as it moves forward between the upper and lower conveyors.

This has a number of definite advantages. For example, when the conveyor is used as an infeed device to a jowel skinning machine, the compressive effect of the upper and lower conveyors will press the jowels flat, resulting in a more complete skinning operation which in practice has been shown to have the unexpected beneficial effect of providing more complete jowel skinning by the skinner machine, leaving fewer skin patches for manual trimming after the jowel has passed through the skinner machine. Another advantage relies upon the positive grip on the conveyed product produced by the pressured contact with both conveyors. This results in a constant positive feed to the secondary machine without slippage of the conveyor.

As best illustrated in FIGS. 2 and 3, the infeed roller assembly consists of a toothed roller bar 101 which is approximately as wide as the upper conveyor and positioned directly in front of the upper conveyor. The roller bar 101 has a plurality of axial grooves 102 therein providing positive gripping teeth on the surface of the roller. The ends 103 and 104 of the roller 101 are rotatably received in bearing assemblies 105 which in turn are journalled in an opening 106 in an arm member 107. An extended portion 109 of the end 103 projects through the corresponding arm 107 and terminates in spaced relation to the outboard end of the arm. A sprocket 110 is received around the end portion 109 of the end 103 to rotatably drive the roller 101. A spacer 111 may be positioned between the sprocket 110 and the roller 101. It will be noted that preferably the end portion 103 and its extension 109 and the end portion 104 are reduced in diameter from the diameter of the grooved portion of the roller 101.

The arms 107 extend backwardly to a shaft 115 which has its ends 116 and 117 received in bearing assemblies 118, 119 which in turn are journalled into openings in mounting brackets 120 attached to the side walls 20, 24 at the front end 35 thereof. The shaft 116 is rotatable in the bearing assemblies 118, 119 and the arms 107 are fixedly attached to the shaft for rotation therewith. Therefore, rotation of the shaft 116 will cause a larger diameter rotation of the roller arm through an arc having its center at the shaft 116. Further, the roller 101 is rotatable in the bearings 105 about its own axis. A chain 121 extending from the sprocket 55 on the upper conveyor front roller 29 to the sprocket 110 on the extension 109 of the end 103 of the infeed roller rotates the infeed roller when the conveyors are actuated. Inasmuch as the infeed roller extends transversely across the front 35 of the housing 11, and inasmuch as it is pivotable with rotation of the shaft 116, its own weight will cause it to fall downwardly, while contact with a product being moved outwardly of the infeed end of the conveyor assembly by the upper and lower conveyor belts will cause the infeed roller to pivotably move upwardly around the shaft 116. A motion limiter 125 is attached to one end 126 of the shaft 116. The motion limiter is best illustrated in FIGS. 2, 6 and 7. The motion limiter consists of a base plate 125 having an angled front edge surface 128 with faces 129 and 130 meeting at approximately the centerpoint 128a of the front edge and angled with respect to one another. An opening 133 receives the shaft 116 with the opening positioned substantially on line with the centerpoint of the front edge 128a. A locking screw 134 received through the plate 125 is provided to firmly attach the plate in non-rotatable relationship with the shaft 116.

Extensions 131 and 132 as illustrated are provided at the spaced-apart ends of the faces 129, 130. The extensions 131, 132 overlap the side wall 20 of the housing and contact it to limit rotational movement of the shaft 116. In this manner, the maximum up and down arcuate movement of the infeed roller 101 is controlled. It can therefore be seen that the roller will of its own weight tend to fall downwardly to where it will contact the upper surface of a product being passed outwardly from the infeed end of the conveyors. Inasmuch as the infeed roller will be rotating the same direction as the direction of movement of the conveyors, it will act to force-feed the intake end of the secondary machine with which the conveyor assembly is associated. The provision of the motion-limiting bracket 125 will maintain the roller in forced contact with the product and prevent the upward movement of the product.

Additionally, an end cover 130 may be provided at the infeed end 35 of the assembly. The end cover preferably extends downwardly across the front of the upper conveyor in spaced relation thereto and terminates in an outwardly turned flange portion thereby preventing upward movement of product between the conveyor and the roller.

It can therefore be seen from the above that my invention provides an infeed conveyor press comprising upper and lower conveyor belts with spaced-apart product contacting surfaces, one of said surfaces converging with the other of said surfaces, pressure plates underlying the surfaces to prevent bowing of the surfaces away from one another whereby the product received between the conveyors will be compressed. Further, in the preferred embodiment, the lower conveyor extends backward beyond the upper conveyor to provide a loading area for the conveyor assembly and an infeed roller is provided at the forward or infeed end of the assembly to positively force feed product received from the conveyor into the infeed section of a secondary machine.

Although I have herein set forth my invention with respect to certain specific principles and details thereof, it will be understood that these may be varied without departing from the spirit and scope of the invention as set forth in the hereunto appended claims.

I claim as my invention:

1. A conveyor assembly comprising: a housing, said housing having a front and rear and sides, rollers rotatably supported by said sides positioned adjacent the said front and the said rear, the said rollers extending transversely through said housing, the said rollers having sprockets thereon, the said sprockets contacting edge portions of an endless conveyor belt extending between said rollers and around said rollers, drive means for at least one of said rollers, an infeed roller, said infeed roller positioned transversely across the said housing at the front thereof forward of the front-most portion of the said conveyor, means responsive to rotation of the front conveyor roller for rotating the said infeed roller, the said infeed roller free to move arcuately upwardly and downwardly with relation to the said housing in response to its own weight and in response to contact with a surface of a product being discharged from the said conveyor, and means for limiting said movement.

2. An infeed conveyor press comprising: a housing, said housing having a front and a back and longitudinal sides, a pair of endless conveyors in said housing, one of said conveyors positioned below the other of said conveyors, at least one of said conveyors converging towards the other of said conveyors from the back to the front of the said housing, the said conveyors having opposed product contacting surfaces, the said conveyors adapted to compress an article received therebetween, an infeed roller, said infeed roller hingeably attached to said housing, said infeed roller positioned adjacent a terminus end of the said other conveyor, said infeed roller rotatable, said infeed roller free to move arcuately upwardly and downwardly with relation to the said housing, and said infeed roller positioned to contact a product leaving the terminus end of the said other conveyor.

3. The device of claim 2 wherein the conveyors extend between the sides of the housing and the surfaces thereof are driven from the back to the front.

4. A conveyor press assembly comprising a housing having side walls, a pair of endless conveyors, said conveyors extending between said side walls, front and back supporting rollers for each of said conveyors, one of said conveyors being shorter from front to back than the other of said conveyors, said one conveyor positioned above said other conveyor, the said conveyors having opposed product contacting surfaces, said conveyors being driven for movement of said surfaces from the back roller to the front roller, at least one of said conveyors inclined toward the other from the back to the front, said product contacting surfaces of the said other conveyor extending beyond the back roller of the said one conveyor, guide plates extending inwardly from the side walls, said guide plates positioned above the lower conveyor, said guide plates having longitudinal walls positioned above the lower conveyor, the walls converging from back to front of the said lower conveyor, and the guide plates terminating in the area between the said conveyors intermediate the ends of the other of said conveyors whereby product received on the other of said conveyors will be guided to a central position of said other of said conveyors by the guide plates and then be subjected to a pressing pressure between the two product contacting surfaces in an area of the assembly beyond the end of the guide plates.

5. The assembly of claim 3 wherein the said side walls are of stepped configuration having a lesser height in the area of the extension of the said other conveyor beyond the back roller of the said one conveyor.

6. The assembly of claim 4 including means to prevent at least one of said conveyors from bowing away from the other of said conveyors in the area between the said rollers under the influence of a product received between the said product contacting surfaces when the product has a dimension normally greater than the dimension between the opposed product contacting surfaces.

7. The assembly of claim 6 wherein both of said conveyors have said means associated therewith for preventing bowing.

8. The assembly of claim 7 wherein said means for preventing bowing comprises rigid pressure plates attached to said side walls, said plates underlying the said product carrying surfaces and extending from adjacent the back roller to adjacent the front roller of each conveyor, a surface of said plates adapted to contact an underside surface of the said product contacting surface of each conveyor to restrict movement of each of said conveyors in a direction away from the other of said conveyors.

9. An infeed conveyor assembly having a housing with a conveyor positioned therein for movement of a product lengthwise of the said housing, the said housing having an inlet end and an outlet end, the said conveyor having a product contacting surface, means for driving the said conveyor whereby a product placed on the product contacting surface at the inlet will be moved to the outlet, an infeed roller assembly, said infeed roller assembly positioned at the outlet end of the said housing beyond the said conveyor, the said infeed roller assembly comprising a rotating member positioned widthwise of the said housing beyond the outlet end of the said housing, means for rotating said member, the said member free to move arcuately upwardly and downwardly with respect to the said housing, means for limiting said motion, the said member having a weight sufficient to urge it to move arcuately downwardly with respect to the housing, and the said member positioned to contact a portion of a product conveyed by the conveyor at the outlet end of the said housing, the said member acting upon the said product at least after the said product has a portion thereof beyond the said conveyor.

10. A conveyor press assembly comprising a housing, said housing supporting two endless conveyors, one of said conveyors positioned above the other of said conveyors, the said conveyors inclinded with respect to one another, the said conveyors having a terminus, an infeed roller positioned above and to the end of the lower conveyor, the roller rotatably attached to the housing and being free to move arcuately vertically, the roller being positioned to contact produce leaving the conveyors at the terminus thereof, and means rotating the roller.

* * * * *